Feb. 4, 1947. H. J. DAUSSAN 2,415,165
STEEL CONVERTER AND THE LIKE
Filed May 21, 1945 2 Sheets-Sheet 1
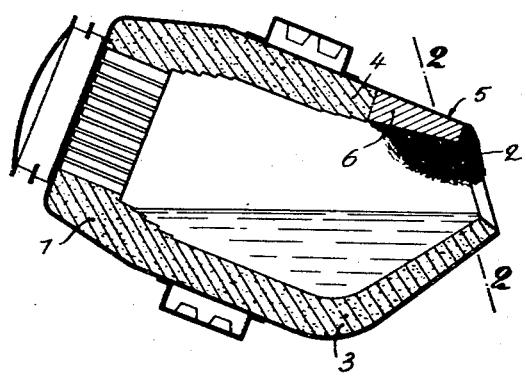
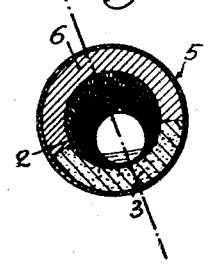
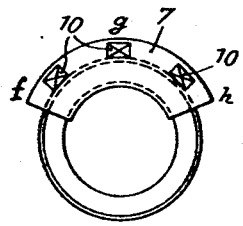
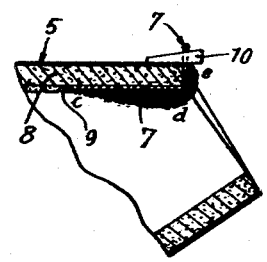
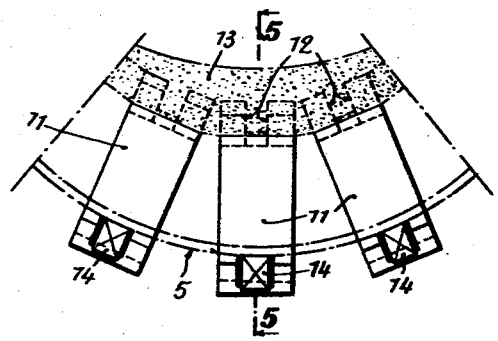
Henri Jean Daussan
INVENTOR:

Feb. 4, 1947. H. J. DAUSSAN 2,415,165
STEEL CONVERTER AND THE LIKE
Filed May 21, 1945 2 Sheets-Sheet 2
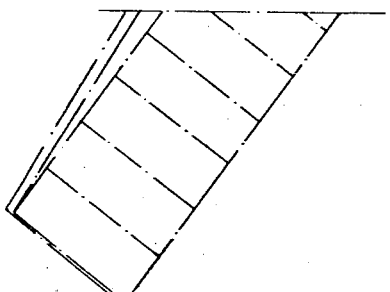
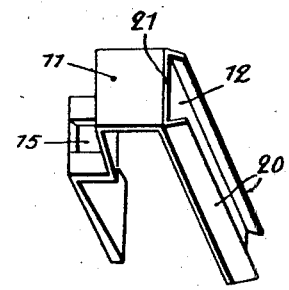
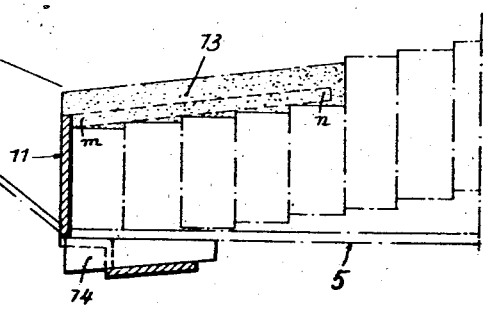
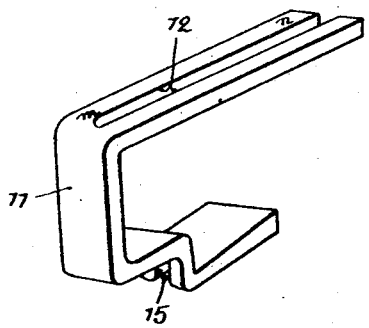
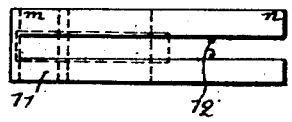
Henri Jean Daussan
INVENTOR:
By 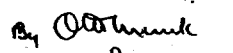
Attorney Patented Feb. 4, 1947

2,415,165

UNITED STATES PATENT OFFICE 2,415,165

STEEL CONVERTER AND THE LIKE

Henri Jean Daussan, Metz, France

Application May 21, 1945, Serial No. 594,904
In France November 5, 1943

20 Claims. (Cl. 266—34)

1

The invention relates to steel converters and similar metallurgical containers for converting cast iron into steel or transferring molten steel or cast iron from an apparatus to another. In such containers, projected particles of metal and of slag always stick to the edges of the orifice and form a mass which progressively increases after each operation and finally obstructs a large portion of the orifice. This is highly detrimental to the proper working of the apparatus; besides, the removal of this mass takes much time and generally damages the walls of the orifice. This involves all sorts of difficulties, the consequence of which is a slackening of the production and a considerable increase of the cost-price.

The present invention, which has for its object to avoid or minimize this drawback, consists in that the part of the orifice in which the slag has a tendency to accumulate is lined with a coating adapted to form a screen between the adherent substances which are deposited at this place and the wall of the converter or the like and to oppose adhesion of said substances unto said wall.

According to a first embodiment of the invention, said lining is made of a heat conducting substance in contact with the external metallic armature of the apparatus, so that the heat may be evacuated by conductivity and by radiation, at such a rate as to produce differences of temperature between the projected particles and the girth of the orifice which prevent, to a large extent, the projected particles from adhering to the orifice.

According to a preferred embodiment of this invention, the lining is made of a substance capable of getting detached or scaling off bodily or by portions from the wall of the apparatus. For instance, it may be made of a substance which disintegrates or melts on its surface in such manner that, even if the difference of temperatures would allow the projected particles of metal and slag to stick to the walls, these would be carried away together with the superficial and less resistant parts of the lining. This disintegration or melting of the surface of the lining can be induced by physical or chemical influences exerted by the molten metal, the slag or the flames and smoke.

The lining can also be made of one or several elements removably mounted, on the exit orifice of the converter or the like, in such manner as to be readily replaced should a mass of slag adhere thereto.

The lining may also possess both the features above-described, i. e., it may be at the same time

2 good heat-conducting and bodily or fractionally removable.

In the accompanying drawings, which show, by way of example various embodiments of the invention:

Fig. 1 shows diagrammatically in longitudinal section, a tilting converter in casting position;

Fig. 2 is a cross-section along the line 2—2 of Fig. 1.

Figs. 3 and 4 represent respectively in longitudinal section and viewed from the end, the neck of a converter constructed according to a second embodiment of the invention.

Fig. 5 is a section along the line 5—5 of the Fig. 6 of a converter, according to a further embodiment of the invention.

Fig. 6 is a corresponding partial end view.

Figs. 7 and 8 show respectively in top plan view and in perspective view one of the removable elements of the lining shown in Figs. 5 and 6, and Fig. 9 is a perspective view of another form of removable element.

In the converter 1 shown in Figs. 1 and 2, the accumulation of slag and metal particles at the neck has in cross-section the shape of a crescent (Fig. 2), the two points of which are very near to each other and turned towards the belly 3, while the thicker part is turned towards the back 4 of the converter. Longitudinally (Fig. 1), the mass of slag and metal particles covers the lining as far as the external edge of the neck. Thomas converters are provided with a dolomitic lining (bricks or agglomerate of dolomite and tar) and, on the circumference of the neck, at least at the back side of the converter, with a lining of silico-aluminous bricks. In Bessemer converters, the lining is of silicious or silico-aluminous converters. In both cases, these refractory linings cover the inner wall of a sheet steel container 5, 30–50 mm. thick, which forms a metallic mass of considerable heat capacity and presenting a large exposed surface for heat radiation. As the lining of the neck girth is a bad conductor of heat the surface thereof reaches a very high temperature, thus offering a favourable ground for the adhesion of projected particles of metal and slag.

According to an embodiment of this invention, the part 5 of the neck lining where slag and metal have a tendency to accumulate is made of a good heat-conducting material in contact with the sheet steel facing or armature 5, serving as a heat-radiating surface. Due to this arrangement, the projected particles will slip on this cooled lining 6, to which they cannot stick.

This lining 6, which may be made of bricks or be laid as a paste, has for example the following composition:

| | Per cent |
|---|---|
| Granulated or pulverized coke, graphite, charcoal, ferric oxide (mill splinters), or iron filings | From 90 to 98 |
| Cement, alkali silicates or ammonium chloride | From 10 to 2 |

Such a lining, suitably placed at 5, leads to the external metal facing the heat received by convection and radiation. The heat-conductivity can be increased by incorporating to the mass scrap iron adapted to make contact with the external facing.

The heat-conducting lining may also consist of blocks of steel or cast iron, cemented or otherwise secured to the external metallic armature, taking care that these blocks should not be heat-insulated from said armature.

Lining 6 may be such that its surface disintegrates or melts, owing either to the oxidation of the carbon, or to the reduction of iron oxide, or to the melting of the surface of the mass, assisted by the presence of cement of alkali silicate or of ammonium chloride, these substances acting as a flux or chemical reagent.

The lining may also consist of a pulverized or granulated substance containing some water or which will give up water, by heating, in order to provide for the tempering and subsequent setting of the product, as described in applicant's copending patent application of same date entitled: "Refractory compositions for use in foundry and the like." For example, the lining may have the following approximate composition:

| | Per cent |
|---|---|
| Coke, graphite, charcoal, iron oxide or iron filings | 90 to 75 |
| Sodium metasilicate ($SiO_3Na_2.9H_2O$) | 10 to 25 |

Such compositions may be directly applied to the still hot wall of the converter, without preliminary tempering, the heat of the wall being sufficient to ensure automatic moistening, subsequent setting of the composition and without any risk of a premature scaling off or loosening.

Figs. 3 and 4 show another embodiment of the invention, wherein an arcuated member 7 of sheet steel or reinforced cement or any other heat conducting material is laid over or laid in the usual refractory lining 8 of the neck of the converter. In the example of Fig. 3, member 7 is laid in a rabbeted part of the lining, a sufficient gap 9 being left to ensure that thermal expansion of said member will not damage the adjoining refractory lining. Member 7 is in contact with the external metallic armature 5, to which it is fixed by means of key wedges 10 or in some other way. Preferably, member 7 should have an expansion coefficient different from that of the mass of slag and metal, so as to facilitate its loosening under the effect of the important changes of temperature which occur during the elaboration or the pouring of the metal.

As above explained, the projected particles will not stick to this cool lining 7 and the front flange *fgh* (Fig. 4) of member 7 prevents the projected particles from sticking to the external armature. In any case, would a mass of slag and metal accumulate at *cde*, it would be easily detached, either by itself, owing to differences of expansion coefficients or by replacing member 7 in a very short time by a new one. It is then easy to clean the old one for further use.

Figs. 5 and 6 show another embodiment of the invention, in which the back side of the converter is here shown tilted downwards. Member 7 is herein replaced by the flat iron straps 11 (Figs. 7 and 8), having a long leg *mn* optionally provided with a slot 12. Three or more such straps 11 may be used to cover a sufficient area where slag and metal tend to accumulate. The branches *mn* of these straps are fitted into a rabbet of the lining, leaving a suitable expansion gap, and are covered with a lining 13 of any one of the preceding compositions or with a conventional refractory plastering if the working conditions are such that the strap, when uncovered after removal of the lining, is liable to melt away too rapidly.

Straps 11 may also be level with the inner wall, as in the case of the Figs. 3 and 4, thus doing away with lining 13.

Straps 11 may be fixed to the external armature in any suitable manner, for example, as shown by means of wedges 14, fitting into an opening of strap 11 and ensuring a fair transmission of heat to the external armature 5 with the minimum projection beyond the latter.

Slot 12 is adapted to increase the adhesion of lining 13 (plastering, mortar, etc.) to straps 11. This slot may be replaced by perforations or depressions on branch *mn* of straps 11, or it may be constituted by the interval between the two wings 20 of an U shaped iron (Fig. 9) the web 21 of which is fixed to strap 11 or is integral therewith. Wings 20 may converge towards the axis of the converter in such manner that straps 11, placed side by side on the wall of the converter and covered with lining 13 will form a vault-like structure held embedded in the masonry without any wedges such as 14.

Members 7 and 11 may be provided with ears, hooks, handles or the like for their ready handling.

Members 7 and 11, especially when made of sheet steel, have an expansion coefficient which is very different from that of a mass of slag, thus facilitating loosening of the latter. Said expansion coefficient should be selected according with the mode of formation of the accumulation of slag and metal, i. e. according as the part of this latter which is in contact with the edge of the neck consists of metal or slag or a mixture of both.

It is evident that the invention is not limited to the embodiments above described, which are given merely by way of examples.

Having now described my invention what I claim as new and desire to secure by Letters Patent is:

1. In a metallurgical container adapted to receive molten metal and slag, an external metallic armature, a refractory masonry and, at places where slag or projected metal tend to accumulate and solidify, a lining of a substance different from said refractory masonry and adapted to oppose permanent adhesion of said slag and metal to the wall of said container.

2. In a metallurgical container adapted to receive molten metal and slag, an external metallic armature, a refractory masonry, and, at places where slag or projected metal tend to accumulate and solidify, a lining of a substance different from said refractory masonry and adapted to facilitate removal of any adherent slag and metal.

3. In a metallurgical container adapted to receive molten metal and slag, an external metallic armature, a refractory masonry and, at places where slag or projected metal tend to accumulate and solidify, a lining of a substance different from said refractory masonry and adapted to oppose permanent adhesion of said slag and metal to the wall of said container and to facilitate removal of any adherent slag and metal.

4. In a metallurgical container adapted to receive molten metal and slag, and external metallic armature, a refractory masonry and, at places where slag or projected metal tend to accumulate and solidify, a lining of a fusible substance different from said refractory masonry and adapted to oppose permanent adhesion of said slag and metal to the wall of said container.

5. In a metallurgical container adapted to receive molten metal and slag, an external metallic armature, a refractory masonry and, at places where slag or projected metal tend to accumulate and solidify, a lining of a friable substance different from said refractory masonry and adapted to oppose permanent adhesion of said slag and metal to the wall of said container.

6. In a metallurgical container adapted to receive molten metal and slag, an external metallic armature, a refractory masonry and, at places where slag or projected metal tend to accumulate and solidify, a lining of a mixture comprising a carbonaceous material tempered with a binding agent.

7. In a metallurgical container adapted to receive molten metal and slag, an external armature, a refractory masonry and, at places where slag or projected metal tend to accumulate and solidify, a lining of a mixture comprising iron oxide and a binding agent.

8. In a metallurgical container adapted to receive molten metal and slag, an external armature, a refractory masonry and, at places where slag or projected metal tend to accumulate and solidify, a lining of a mixture comprising iron filings and a binding agent.

9. In a metallurgical container adapted to receive molten metal and slag, an external armature, a refractory masonry and, at places where slag or projected metal tend to accumulate and solidfy, a lining of a mixture comprising a comminuted solid material adapted to be eliminated in contact with the hot slag and metal and a flux.

10. In a metallurgical container adapted to receive molten metal and slag, an external armature, a refractory masonry and, at places where slag or projected metal tend to accumulate and solidify, a lining of a mixture comprising a comminuted solid material and sodium metasilicate adapted to give off tempering water upon heating.

11. In a metallurgical container adapted to receive molten metal and slag, an external metallic armature, a refractory masonry and, at places where slag or projected metal tend to accumulate and solidify, a lining of a heat-conducting substance in contact with said metallic armature, whereby heat is transmitted through said lining to said armature acting as a heat radiating surface to cool down said lining and prevent permanent adhesion of said slag and metal.

12. In a metallurgical container adapted to receive molten metal and slag, an external metallic armature, a refractory masonry and, at places where slag or projected metal tend to accumulate and solidify, a bodily detachable lining of a heat-conducting substance in contact with said metallic armature, whereby heat is transmitted through said lining to said armature acting as a heat-radiating surface, to cool down said lining and prevent permanent adhesion of said slag and metal.

13. In a metallurgical container adapted to receive molten metal and slag, an external metallic armature, a refractory masonry and, at places where slag or projected metal tend to accumulate and solidify, a lining made up of detachable elements of a heat-conducting substance in contact with said metallic armature, whereby heat is transmitted through said lining to said armature acting as a heat-radiating surface, to cool down said lining and prevent permanent adhesion of said slag and metal.

14. In a metallurgical container adapted to receive molten metal and slag, an external metallic armature, a refractory masonry and, at places where slag or projected metal tend to accumulate and solidify, a lining of a heat-conducting substance in contact with said metallic armature, whereby heat is transmitted through said lining to said armature acting as a heat-radiating surface, to cool down said lining and prevent permanent adhesion of said slag and metal, the expansion coefficient of said substance being distinctly different from that of the slag and metal deposit liable to accumulate thereon.

15. A container as claimed in claim 12, wherein said lining consists of a detachable metallic arcuated member covering portions of the masonry adjacent the outlet of said container.

16. A container as claimed in claim 13, wherein said elements consist of metallic blocks cemented to the metallic armature adjacent the outlet of said container.

17. A container as claimed in claim 13, wherein said elements consist of metallic straps having inward portions covering the masonry adjacent the outlet of said container.

18. In a steel converter, an external metallic armature, an internal refractory masonry, and, adjacent the neck of the converter, a detachable inner heat-conducting lining in thermal contact with said armature.

19. In a steel converter, an external metallic armature, an internal refractory masonry, and, adjacent the neck of the converter, detachable metal straps in thermal contact with said armature and forming an inner heat-conducting lining.

20. A steel converter as claimed in claim 18, further comprising a plastering of a substance adapted to wear off in contact with hot slag and metal, said plastering covering said heat-conducting lining.

HENRI JEAN DAUSSAN.

REFERENCES CITED

The following references are of record in the file of this patent:

UNITED STATES PATENTS

| Number | Name | Date |
| --- | --- | --- |
| 117,248 | Bessemer | July 25, 1871 |
| 131,867 | Fisher | Oct. 1, 1872 |
| 2,079,872 | Quinn | May 11, 1937 |
| 2,251,303 | Story, et al. | Aug. 5, 1941 |